July 16, 1963

E. E. MALLORY ET AL 3,097,394

TIRE CURING PRESS

Filed Oct. 10, 1960

INVENTORS
EDWIN E. MALLORY & ARMINDO CANTARUTTI
BY
Oberlin, Maky & Donnelly.
ATTORNEYS INVENTORS
EDWIN E. MALLORY &
ARMINDO CANTARUTTI
BY
Oberlin, Maky & Donnelly
ATTORNEYS

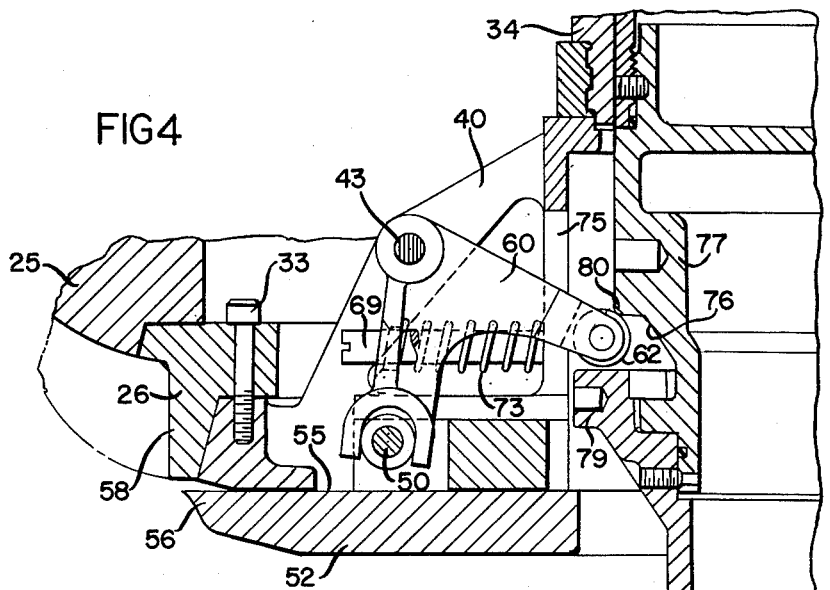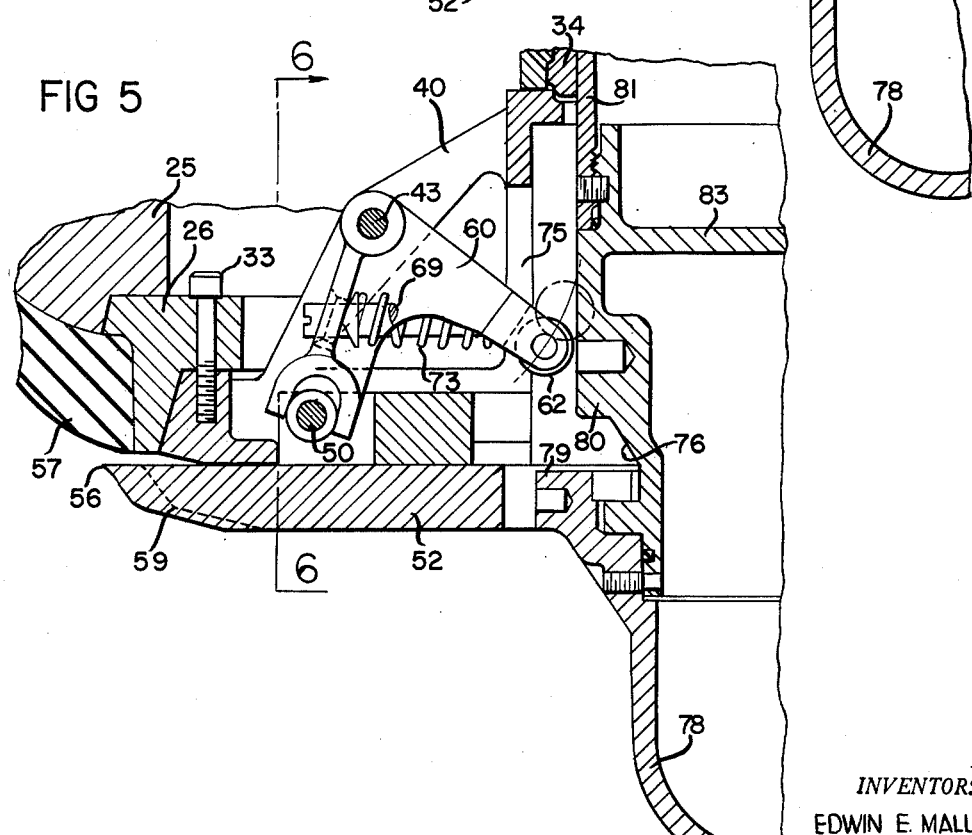

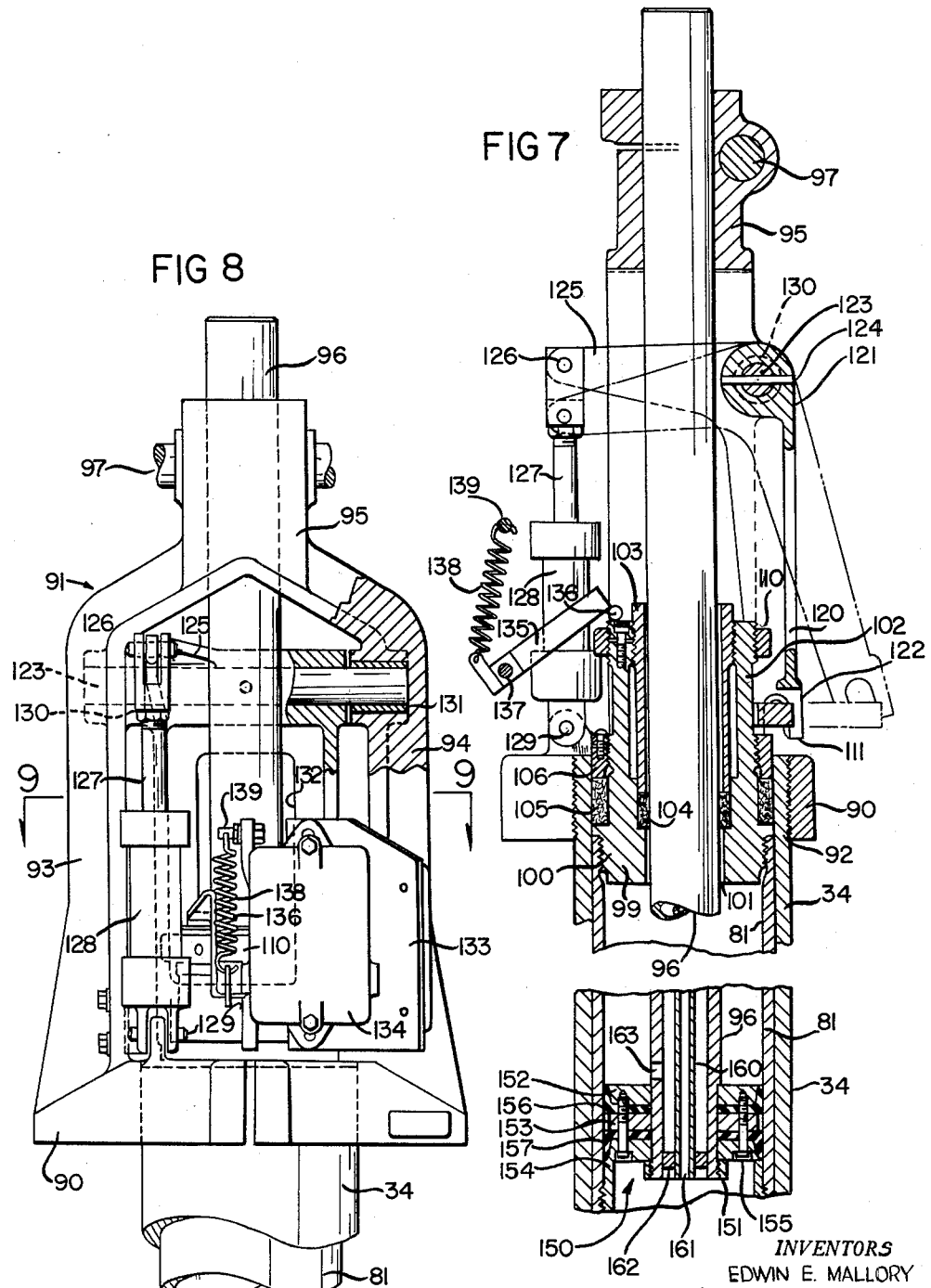

INVENTORS
EDWIN E. MALLORY &
BY ARMINDO CANTARUTTI
Oberlin, Maky & Donnelly
ATTORNEYS

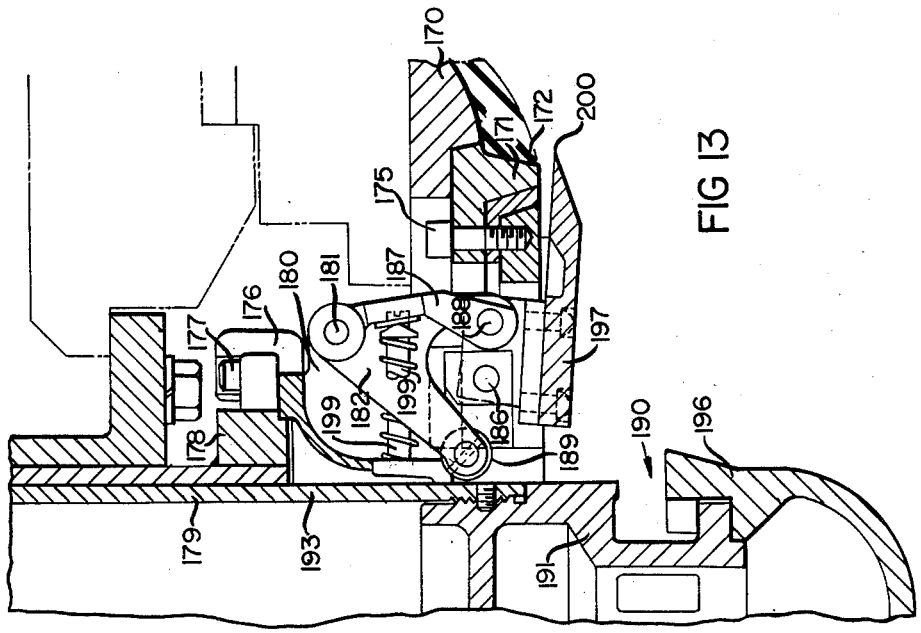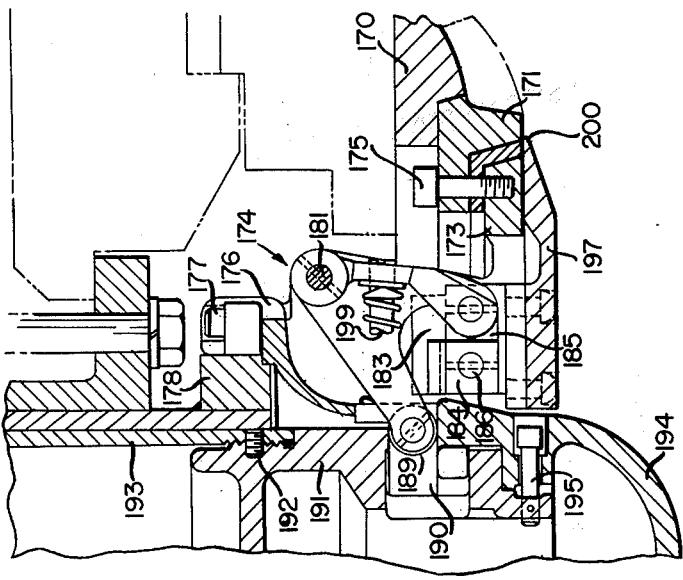

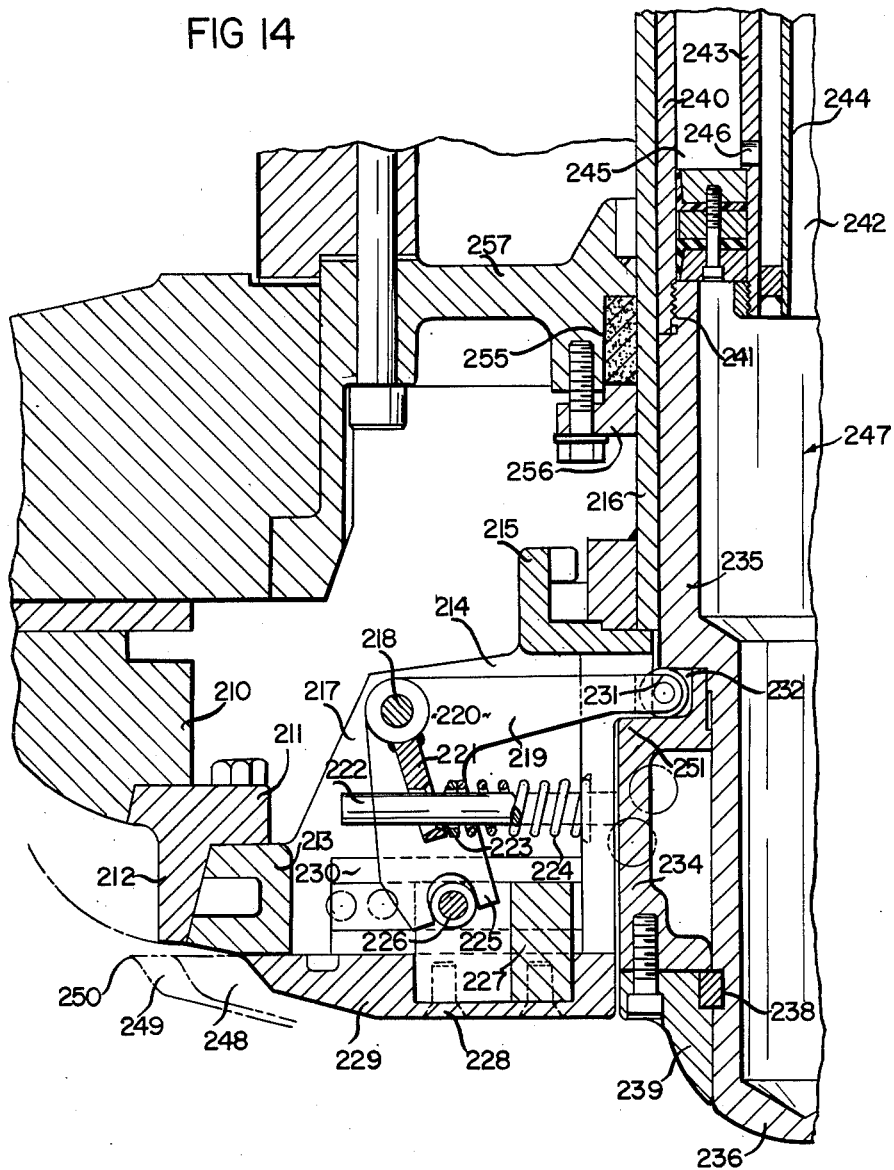

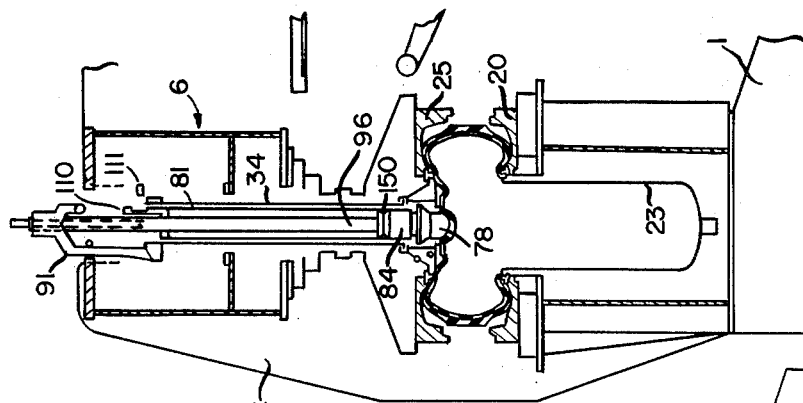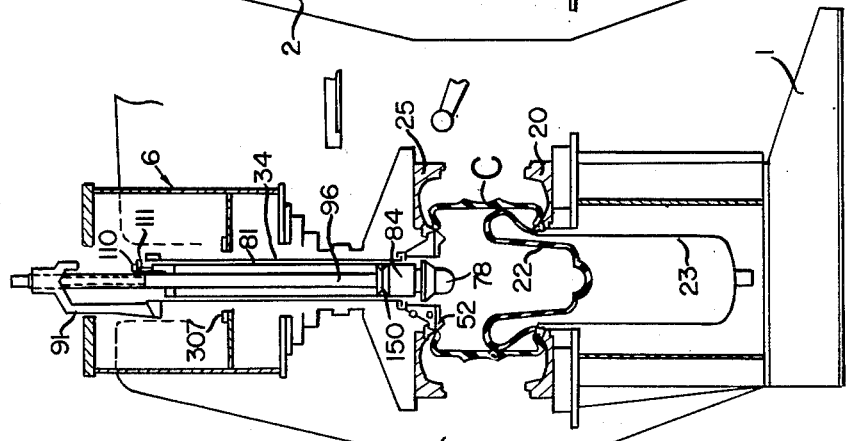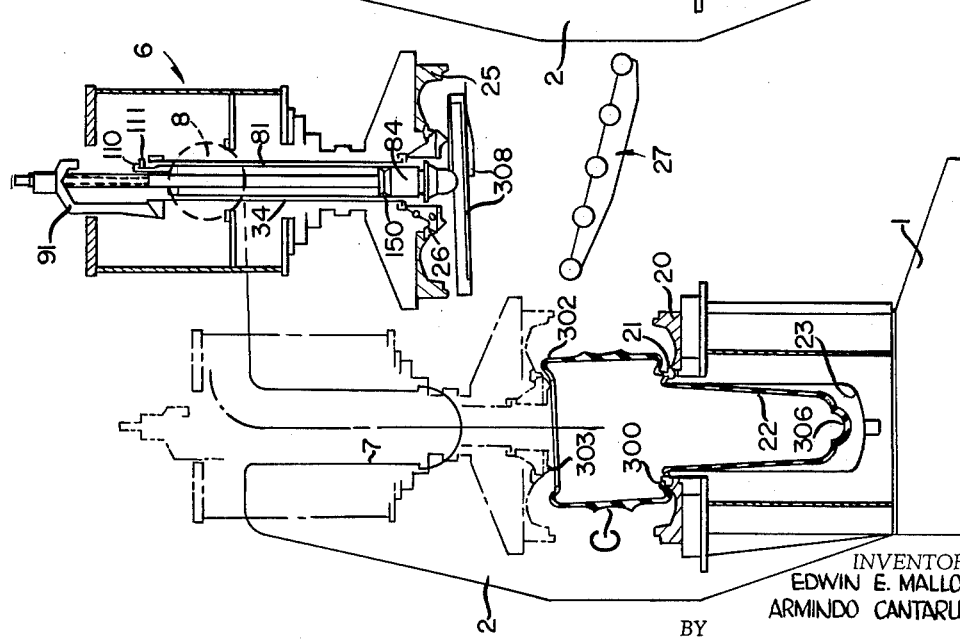

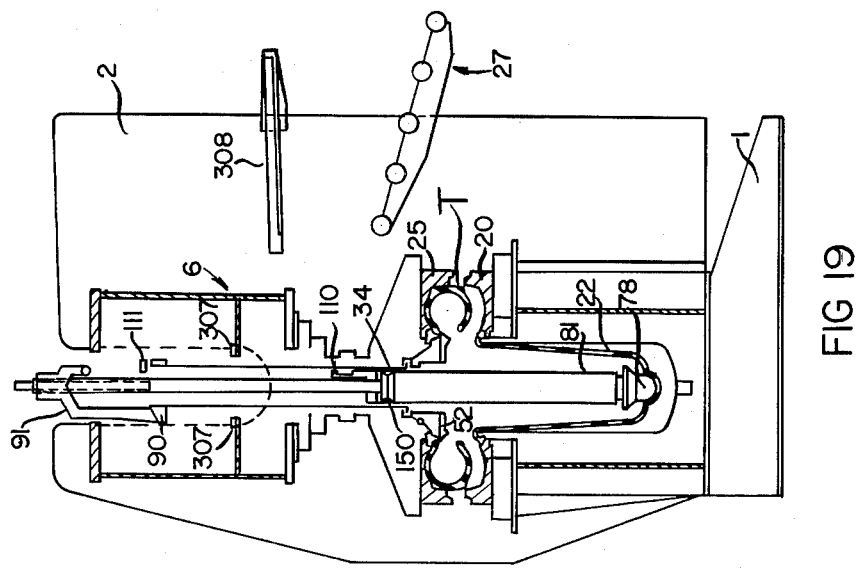
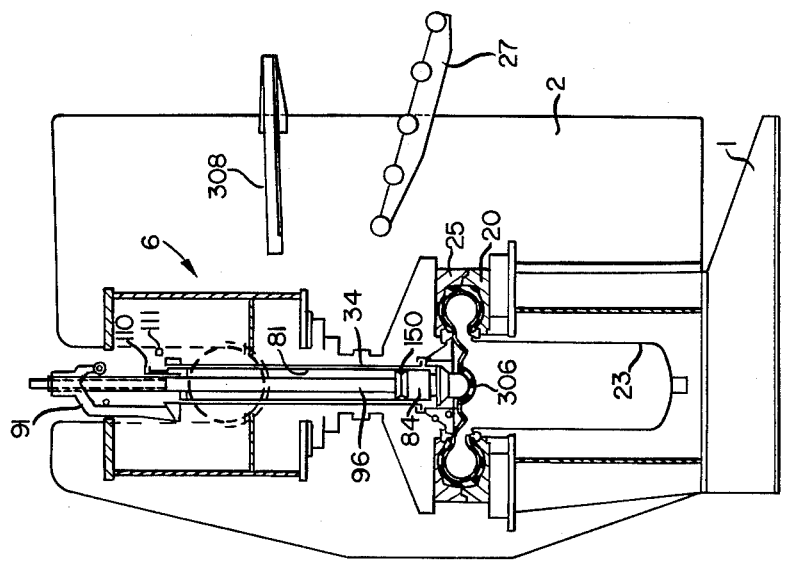

INVENTORS
EDWIN E. MALLORY & ARMINDO CANTARUTTI
BY
Oberlin, Maky & Donnelly
ATTORNEYS

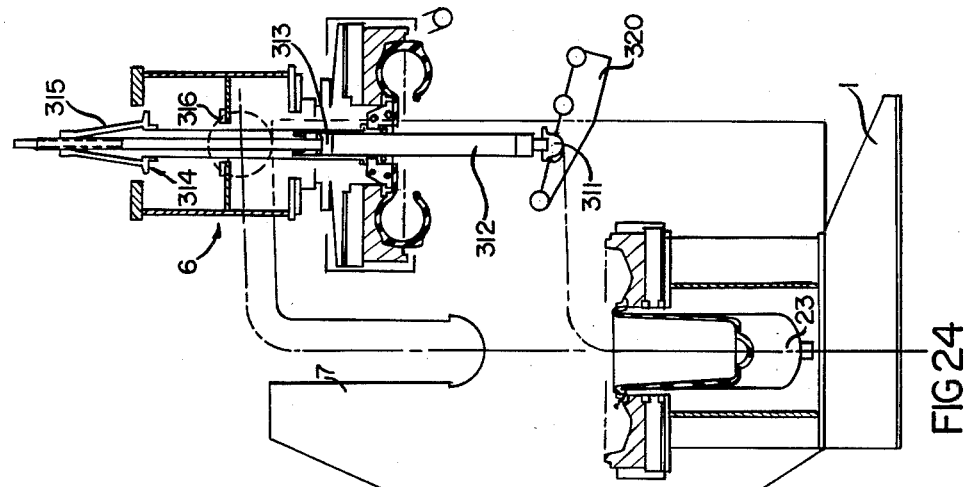
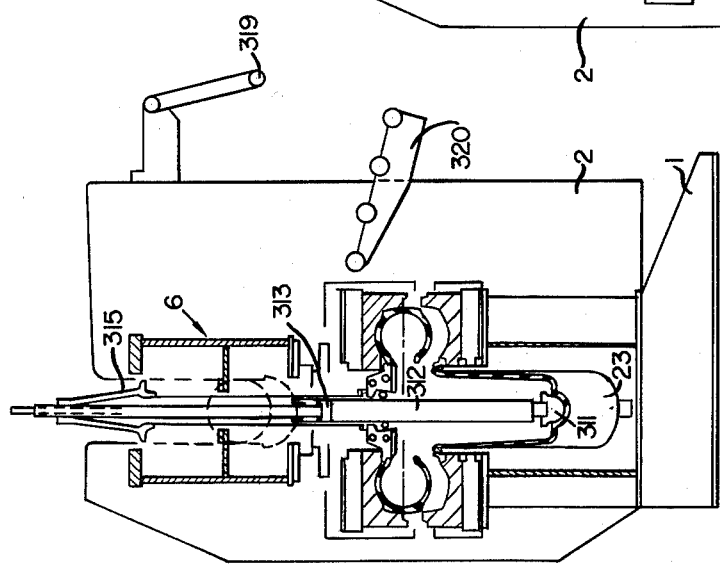
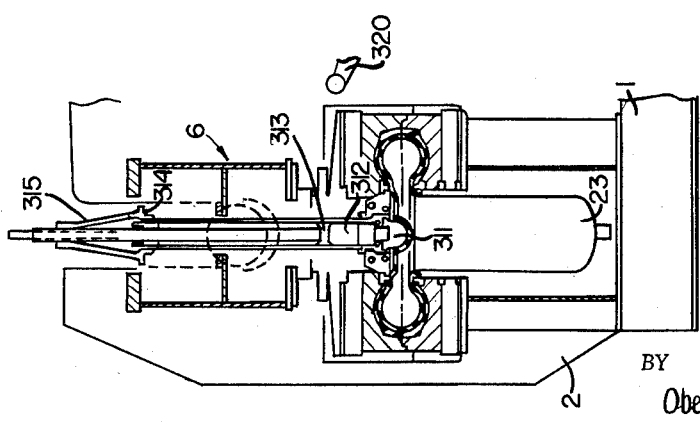

July 16, 1963

E. E. MALLORY ET AL 3,097,394

TIRE CURING PRESS

Filed Oct. 10, 1960

INVENTORS
EDWIN E. MALLORY & ARMINDO CANTARUTTI
BY
Oberlin, Maky & Donnelly
ATTORNEYS United States Patent Office 3,097,394
Patented July 16, 1963

3,097,394
TIRE CURING PRESS
Edwin E. Mallory and Armindo Cantarutti, Cuyahoga Falls, Ohio, assignors to National Rubber Machinery Company, Akron, Ohio, a corporation
Filed Oct. 10, 1960, Ser. No. 61,664
20 Claims. (Cl. 18—17)

This invention relates generally, as indicated, to a tire curing press and more particularly to a tire curing press incorporating a tire chucking mechanism enabling such press to be fully automated for tire production.

In automatic tire making machinery and especially in automatic tire presses wherein a carcass is loaded onto the bottom mold section when the press is opened, and the top mold section then closes on top of the upright carcass shaping or bellying the carcass while a forming bag or bladder is inserted to cause the swelling of the carcass to tire shape as the press closes, it is difficult to strip the bag from the carcass after the curing cycle and yet not strip the tire from the top mold section so that it will be deposited in the proper position at the proper time.

In automatic tire presses of the type wherein the top mold section moves directly away from and then laterally of the bottom mold section, the shaped tire is required to be stripped from the top mold section when the top mold section is laterally offset from the bottom mold section to be deposited on a conveyor or the like or in a post-inflation device while the then exposed bottom mold section is being loaded with a green pulley band carcass. Thus, it becomes important in automatic presses that the finished tire not be stripped or removed prematurely from the top mold section to drop upon the bottom mold section thus to preclude the proper loading of the next pulley band carcass and to form blemishes on the finished tire owing to contact with the heated bottom mold section. This problem becomes even more acute when an upstanding forming bag or bladder is employed since the tire must be lifted bodily over such upstanding bag.

Moreover, when the press closes upon the pulley band carcass in some presses and especially in the case of a heavy duty truck tire carcass, the beads of the carcass are not always necessarily aligned with the toe ring of the top mold section. Thus a construction of the top mold section which would pilot or guide the upstanding pulley band carcass into proper engagement with the toe ring of the top mold section is greatly to be desired.

It is accordingly a principal object of the present invention to provide a tire press which will pilot the upstanding pulley band carcass into proper engagement with the toe ring of the top mold section.

It is another principal object of the present invention to provide a tire curing press having a tire chucking apparatus which will facilitate the stripping of the forming bag from the tire and yet preclude the premature stripping of the tire from the top mold section.

It is another principal object of the present invention to provide a chucking apparatus as set forth in the preceding paragraph which includes a ram which will push or invert a bladder to strip the same from the interior of the tire and remove it from the path of the finished tire as it is moved from the press.

It is yet another principal object of the present invention to provide a tire curing press wherein the top press head incorporates a ram for removing and stripping the bladder from the carcass and inverting the same to remove it from the path of the finished tire as well as a tire chucking apparatus operated thereby and a means to strip the tire from the toe ring of the top mold section.

It is yet another object of the present invention to provide a tire chucking apparatus which will enable a tire press readily to handle heavy duty truck tires piloting the same into proper engagement with the toe ring of the top mold section.

It is another object of the present invention to provide a tire chucking apparatus which can readily be incorporated in existing presses.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 4 is a fragmentary sectional view of the three position chucking device shown in its green pulley band tire carcass piloting position;

FIG. 5 is a fragmentary sectional view similar to FIG. 4 showing the three position apparatus in its extended tire holding position;

FIG. 7 is a fragmentary sectional view of an automatic stop mechanism for controlling the three position chucking apparatus;

FIG. 8 is a fragmentary sectional view of the apparatus shown in FIG. 7 as seen from the left thereof;

FIG. 12 is a fragmentary sectional view of a further embodiment of a tire chucking apparatus;

FIG. 13 is a fragmentary sectional view of the apparatus of FIG. 12 illustrating the chucking device in its tire holding position;

FIG. 14 is a fragmentary sectional view of a slightly modified further embodiment of the present chucking apparatus;

FIGS. 15 through 21 are schematic views of a tire press showing the various operational positions of the three position chucking apparatus for heavy duty truck tires in accordance with the present invention; and FIGS. 22 through 26 inclusive illustrate various operating positions of a tire press having a two position chucking apparatus in accordance with the present invention.

*The Tire Press (FIG. 1)*

Figure 1:
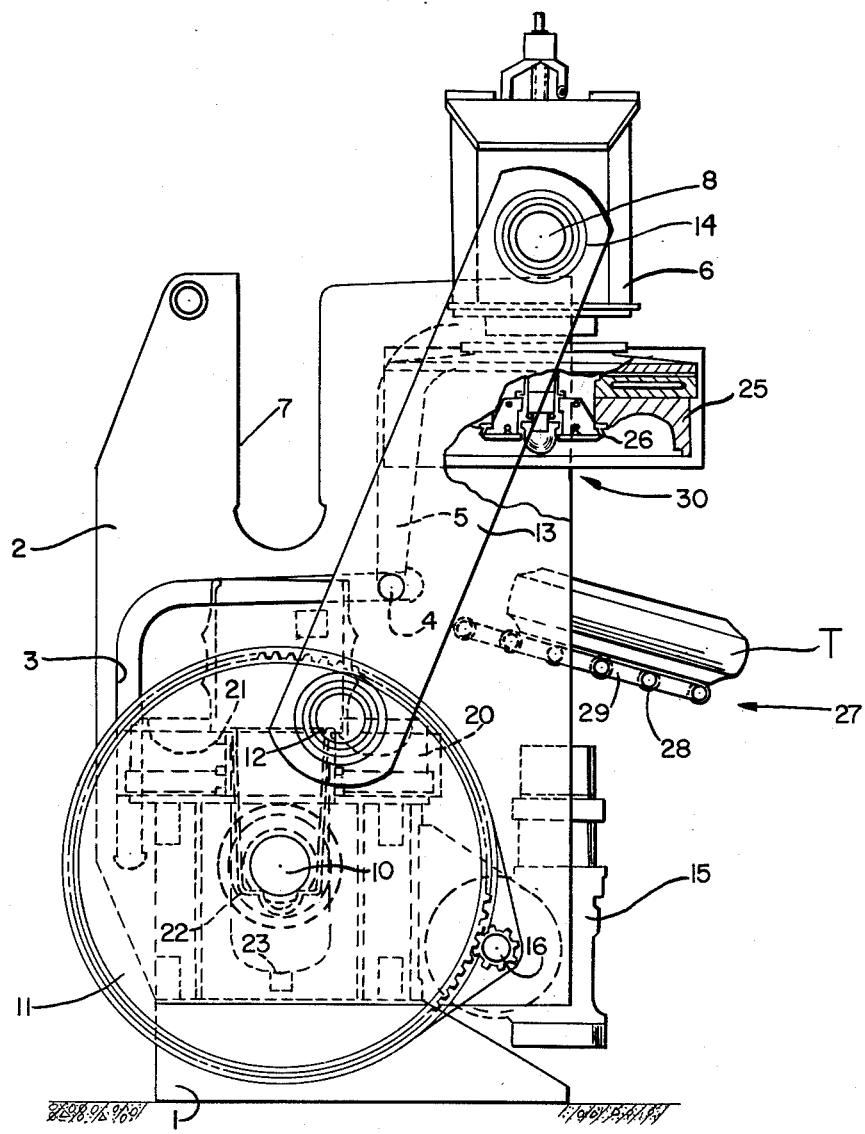
FIG. 1 is a fragmentary sectional view of an exemplary tire press constructed in accordance with the present invention.

The present invention may preferably be employed with a tire curing press of the type shown in FIG. 1. The press comprises a base 1 having a pair of upstanding plates 2 secured to the opposite ends thereof. Each of the plates 2 is formed with a first guide slot 3 for a guide roller 4 mounted on a depending bracket 5 secured to the upper press head 6, such first slot 3 including a vertically extending portion and a generally horizontally extending portion as shown. Each plate 2 is also formed with a second guide slot 7 including a vertically extending portion and a generally horizontally extending portion in which the top of the slot is omitted. At each end of the press head 6, there is a shaft 8 which is guided in the slot 7 formed in the plates 2. Thus the press head 6 which is pivotally mounted on the shafts 8 will be guided through a generally L-shape path corresponding to the shape of guide slot 7.

Journalled in each end of the base 1 is a stub shaft 10 of a bull gear crank 11 and pivotally secured to the crank pin 12 thereof is the lower end of a crank link 13, the upper end of which is pivotally secured on the shaft 8 at the respective ends of the press head 6. As shown, the press head 6 extends between the plates 2 and preferably each shaft 8 thereof has a guide bushing 14 thereon which is in close sliding fit to the vertical portion of slot 7. The bull gear cranks 11 are driven by electric motor driven gear reducers 15, the output shafts of which each have a pinion 16 thereon in mesh with the teeth of the corresponding bull gear crank.

The press is shown in its FIG. 1 position as opened with the crank pins 12 being near the top and the links 13 disposed in an inclined position. The rollers 4 carried by the brackets 5 depending from the press head 6 are disposed adjacent the ends of the horizontal portions of the guide slots 3. Similarly, the shafts 8 of the press head 6 are disposed adjacent the ends of the horizontal top portions of the guide slots 7.

The base 1 of the press carries a pair of bottom mold sections 20 in side-by-side relationship, each of which, as well known in the art, is formed with an annular cavity which constitutes the molding surfaces for the bottom bead, bottom side wall, and the lower half of the tread, or skid portion of a tire. Each mold section 20 is provided with a toe ring 21 over which the bottom bead of a pulley band carcass is adapted to be positioned and, of course, each mold section has a heating platen thereunder. Interiorly of the toe ring 21, there is secured a bladder or forming bag 22 which fits in its invaginated or inverted position down into a well 23 formed centrally in the base 1 of the press. In a conventional manner, the bladder 22 seals the upper portion of the well such that pressure in the lower portion of the well will cause the erection or invagination of the bladder and continued pressure will thereby extend the bladder into the tire carcass for shaping and bulging outwardly as the press head bellies the pulley band carcass.

The press head 6 likewise carries a pair of side-by-side downwardly facing top mold sections 25 which like the bottom mold sections 20 each define an annular cavity providing the molding surfaces of the top bead, the top side wall, and the upper half of the tread or skid portion of the tire. Again, a heating platen is interposed between the top mold section 25 and the press head. A vertically movable toe ring 26 is provided in the center of the top mold section 25 which engages the top bead of the pulley band carcass when the press is brought to a closed position such that it forms a tire-shape cavity between the top and bottom mold sections whereby the carcass will be bellied and the tire will be then cured to final shape by circulation of curing medium such as hot water or steam under pressure through the interior of the carcass as well as through the platens. When the press is in its closed position, the crank pins 12 will be at the bottom of the bull gear with the links 13 disposed in a generally vertical position. The rollers 4 which are carried by the brackets 5 depending from the press head will be disposed adjacent the bottoms of the vertical portions of the guide slots 3 and similarly the shafts 8 of the press head 6 will be disposed adjacent the bottoms of the vertically disposed portions of the guide slots 7. Thus to close the press, the bull gear cranks 11 will be rotated in a counterclockwise direction to position the pins 12 to move the head to its closed position. It can readily be seen that the roller 4 within the slot 3 which is attached by means of bracket 5 to the head 6 will maintain the upper mold section 25 always substantially parallel to the lower mold section 20.

It is noted that when the press is in its open position shown, the space above the bottom mold section 20 is unobstructed so that a pulley band carcass may easily be positioned from overhead in an upright position around the toe ring 21 of the bottom mold section. Also, in the open position, the top mold section 25 is laterally offset from the bottom mold section 20 such that the cured tire may be dropped therefrom while the press is being loaded by a convenient stripping mechanism to be placed upon a discharge path defined by a conveyor 27 to be moved from the press. Accordingly, the unloading conveyor 27 comprises a downwardly and rearwardly tilted platform carrying anti-friction rollers 28 which may be supported by bars 29 pinned to the respective end plates of the tire press. Thus, the illustrated tire press may simultaneously be loaded and unloaded more readily to facilitate automated curing of green tire carcasses.

The hereinabove described tire press is Slide-Back Autoform Vulcanizer which is manufactured and sold by the National Rubber Machinery Company of Akron, Ohio, to tire manufacturers for producing tires uniformly in great quantity. Reference may be had to the copending application of James W. Brundage and Edwin E. Mallory, entitled, "Tire Handling and Curing Press," Serial No. 732,531, filed May 2, 1958, now Patent No. 3,065,499, for a more complete description of this particular press.

In the center of the vertically movable toe ring 26 within the top mold section 25, there is provided the chucking device generally shown at 30 which forms the present invention.

*Ram and Chucking Segments, Three Position Chuck FIGS. 2, 3, 4, 5 and 6*

Referring now more particularly to FIGS. 2 through 6 inclusive, it will be seen that the annular top mold section 25 is provided with an annular shouldered seat 31 for the toe ring 26. Such toe ring 26 is fastened directly to an annular frame member 32 as by means of bolts 33 so that it is vertically movable therewith. The annular frame member 32 is secured to a vertically extending tubular member 34 which extends centrally through the press head aligned with the top mold section. The tubular member 34 is mounted for vertical movement with respect to the press head 6 and such movement may be accomplished, for example, by any actuating linkage interposed between the press head and the top of the tubular member 34. As an example of such means, reference may be had to the Brundage Patent No. 2,778,060 in which dual piston cylinder assemblies are employed vertically to move the tubular member and thus the toe ring of the top mold section to strip the tire from the top mold section.

Figure 2:
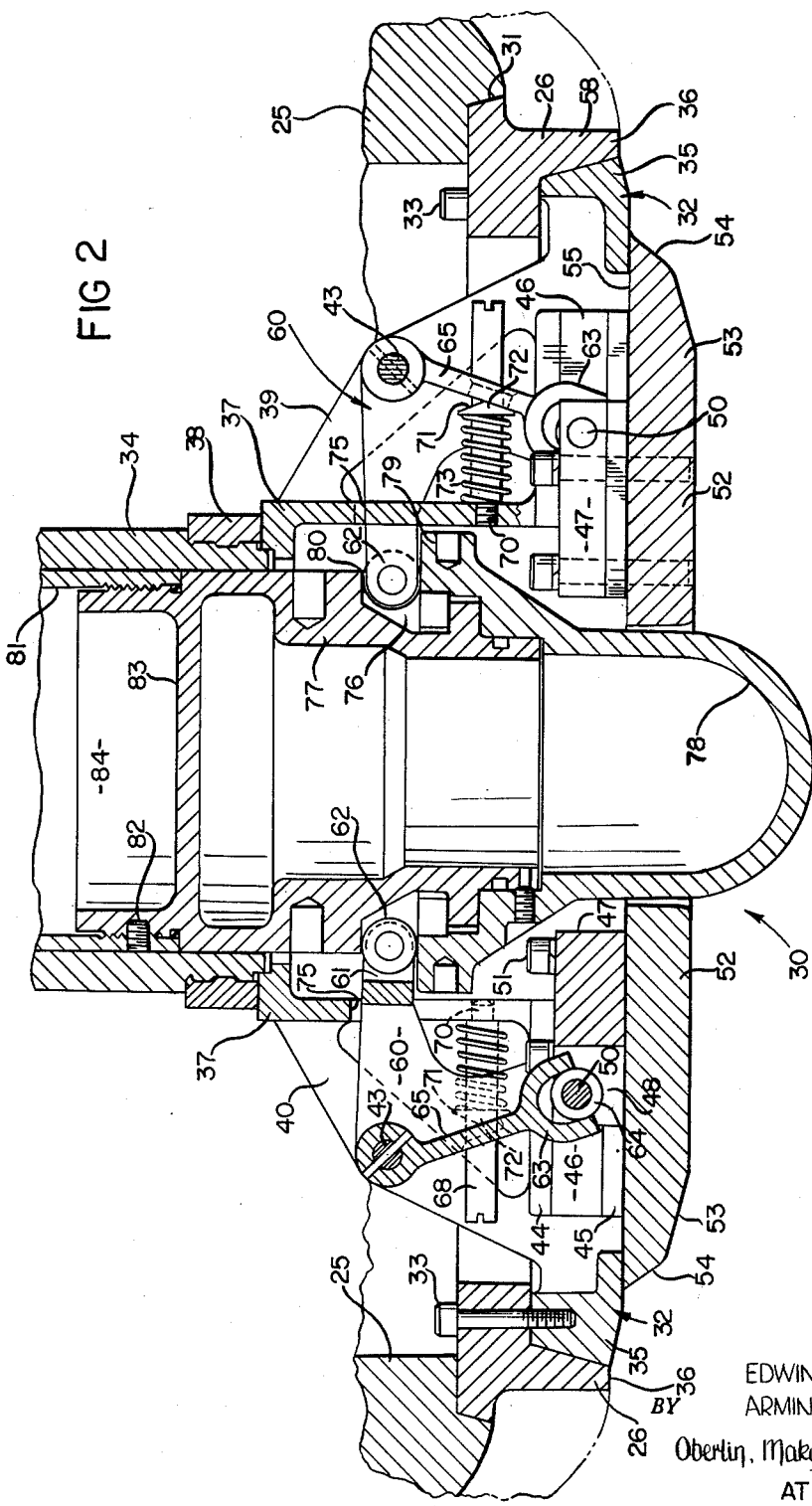
FIG. 2 is a fragmentary sectional view of a three position tire chucking apparatus in accordance with the present invention.

The frame member 32 will, of course, include the radially extending portion 35 which tapers into the bottom 36 of the toe ring 26 and an upstanding annular portion 37 connected to the tubular member 34 through ring 38. Bridging the upstanding annular portion 37 and the radially extending annular portion 35 of the frame member 32 are four quadrant spaced pairs of web members 39 and 40 having respective inwardly directed bosses 41 and 42 accommodating pivot pin 43 therein. Also, each web member 39 and 40 is provided adjacent the lower edge thereof with vertically spaced pairs of horizontally extending flanges 44 and 45 forming a guideway 46 therebetween. The flanges 44 and 45 thus provide a guideway 46 for a guide block 47 having horizontally laterally extending portions fitting within the guideway 46. (Note especially FIG. 6.) Each guide block 47 is substantially U-shape having legs 48 and 49 with pivot pin 50 extending therebetween. Four bolts 51 secure each block 47 to its respective tire chucking segment 52. Thus, each tire chucking segment is mounted for movement radially of the axis of the top mold section as the result of the block 47 being secured within the horizontally extending guideway 46 in the frame member 32. As seen in FIG. 2, the peripheral edge of the chucking segments 52 are provided with a first sloping surface 53 and a peripheral more sharply sloping surface or beveled portion 54. The top surface 55 of the chucking segments 52 closely underlies the annular frame portion 35 of the frame 32 and it can now be seen that the chucking segments are movable along the guideways 46 from the retracted position shown in FIG. 2 to the piloting or semi-extended position shown in FIG. 4 and then to the chucking or tire holding position wherein the tip edge 56 of the chucking segments 52 underlies the annular bead 57 of the tire T as shown in FIG. 5. In this manner, the tire will be precluded from falling from the top mold section when the press is opened such that the tire can properly be stripped from the press head to be positioned on the discharge conveyor 27.

Figure 3:
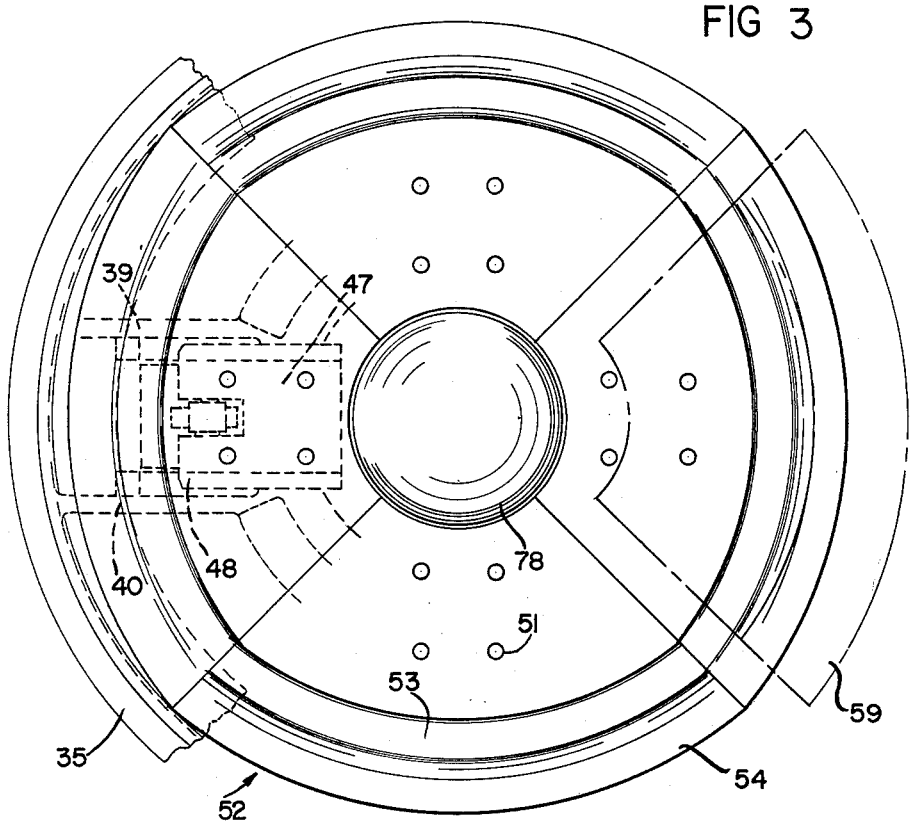
FIG. 3 is a bottom plan view of the apparatus shown in FIG. 2.
Figure 6:
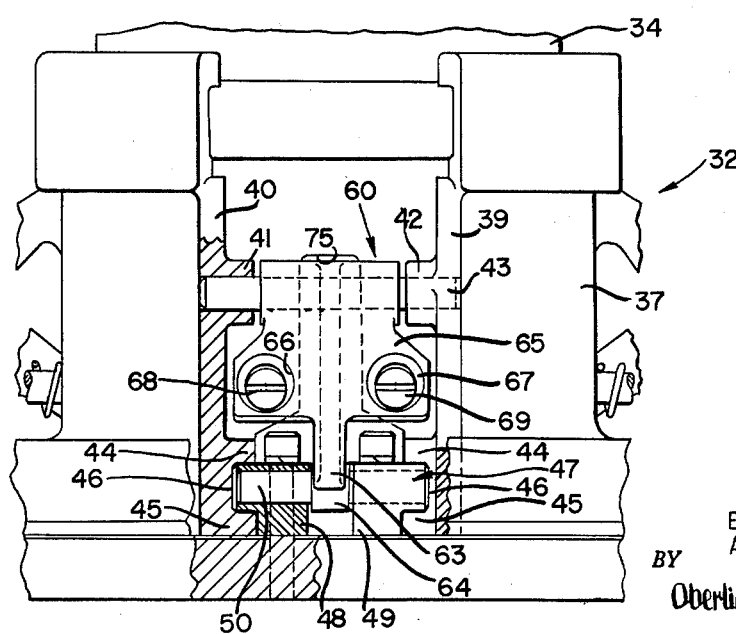
FIG. 6 is a fragmentary sectional view taken substantially on the line 6—6 of FIG. 5.

With special reference to FIG. 3, it will be seen that the chucking segments 52 form a complete circle with the center of tubular extension 34 as the center thereof when in the piloting position shown in phantom lines at 59 and when in a retracted position, the adjacent segments are drawn into juxtaposition and the sides are such as to form a generally circular boss having the four slightly flattened sides. In the phantom line position shown at 59 in FIG. 3, the circular periphery of the chucking segments facilitates the conformation of the tip edge 56 with the cylindrical surface 58 of the toe ring such that the chucking segments will act properly as a pilot to guide the bead of the carcass into the toe ring. Since this is the only position in which a circular periphery of the chucking segment is required, it will be seen that the centers of the segment edges are so chosen properly to provide this circular outer edge.

Now in order to impart radial movement to the segments 52, there is provided between each of the four pairs of web members 39 and 40 on the frame 32 a bell crank 60 secured to the pin 43 for pivotal movement about the pivot provided thereby. The upper leg of each bell crank 60 terminates in a U-shape portion 61 with a roller 62 being provided rotatably mounted between the legs of such U-shape portion. The lower leg of this bell crank terminates in a U-shape portion 63 closely fitting on wear collar 64 surrounding pin 50 such as to impart radial horizontal movement to the block 57 upon pivot of the bell crank 60 about pivot 43. The lower leg of the bell crank includes a transversely extending flange portion 65 of the configuration as seen more clearly in FIG. 6, such web or flange portion 65 of each bell crank being provided with two beveled or countersunk apertures 66 and 67. These apertures are of such dimension that each bell crank 60 may be pivoted about the pivots 43 through the required arc without hindrance from rods 68 and 69 extending through such apertures 66 and 67. These rods 68 and 69 are threaded into the upstanding portion 37 of the frame member 32 as shown at 70 and each rod has slidably mounted thereon a bearing member 71 having a ridge or point 73 to provide a substantially line contact between such bearing member and the interior of the web or flange 65. Interposed between the bearing member 71 and the wall of the upstanding portion 37 of the frame member 32 is a compression spring 73 closely surrounding each rod 68 and 69 such that there will be a constant spring pressure against the web or flange portions 65 of each bell crank 60 tending to pivot the bell cranks about the pivots 43 to move the chucking segments 52 radially outwardly.

The upper arm of each of the bell cranks 60 extends through a vertically extending slot 75 in upstanding portion 37 of the frame member 32, this cutout portion accommodating the upper arm of the bell crank 60 for vertical movement as shown in FIGS. 4 and 5. The rollers 62 of each of the bell cranks 60 fit within an annular recess 76 in ram member 77. Secured to the member 77 is the ram head or nose 78. The ram head 78 is provided with a radially extending portion 79 providing an upwardly facing shoulder which is spaced from the top shoulder 80 of the recess 76 a distance closely to accommodate the roller 62. The ram member 77 is secured to sleeve 81 as shown at 82 and a web 83 provides an interior sealed portion 84. The ram members 77 and 78 are accordingly mounted within the tubular member 34 for vertical movement. This vertical movement is accomplished by a piston inside the sleeve 81 as will hereinafter be more fully described. Thus, the annular recess in the ram is bounded on the top by shoulder 80 and on the bottom by the radially laterally extending shoulder 79 and it is these shoulders that engage the roller 62 to control the pivotal movement of the bell crank 60 thus to control the radial movements of the chucking segments 52 as the ram head 78 is extended and retracted.

Moving from the retracted position of FIG. 2 to the intermediate or piloting position of FIG. 4, it will be seen that the downward movements of the member 77 causes the shoulder 80 to bear against the roller pivoting the illustrated bell crank 60 of FIG. 4 in a clockwise direction about the pivot 43. The spring 73, of course, will assist in the pivoting of the bell crank member 60. As the ram head moves downwardly, the roller 62 will then swing clear of the shoulder 80. The rods 68 and 69 may act as stops within the apertures 66 and 67 to bring the segments 32 to a stop in the position shown in FIG. 5. This is the position in which the tip edge 56 underlies the bead 57 to hold the tire such that it cannot fall from the top mold section 25. The movement then from the position of FIG. 2 to the position of FIG. 4 slides the tire chucking segments 52 outwardly from the retracted to the piloting position wherein the peripheral edge 56 will be in circular form to guide the upper bead of the pulley band carcass into the cylindrical surface 58 of the toe ring 26. The parts then will be in the relative positions shown in FIG. 4. The parts will remain in this position while pressure is inserted into well 23 to invaginate the bladder 22 and subsequently to swell the carcass to tire shape as the press mold halves come together to form the tire-shape mold. As soon as the curing cycle is completed, the ram head 78 will be extended moving the segments to the chucking position shown in FIG. 5 and the head 78 will extend then downwardly to force the bladder into the well inverting it to its original position as shown in FIG. 1. This operation of the mechanism will hereinafter be more fully described.

*Ram Stop Mechanism (FIGS. 7 through 11 inclusive)*

In order properly to position the ram in the position shown in FIG. 4 and 5, a mechanism may be provided as illustrated more clearly in FIGS. 7 through 11. Referring first to FIG. 7, it will be seen that the tubular extension 34 extends upwardly through the press head 6 and is threaded to the base 90 of spider 91 as shown at 92. As seen more clearly in FIGS. 8 and 9, the spider 91 includes two upstanding spaced frame members 93 and 94 which are joined at the top as shown at 95 and a vertically extending tube 96 is secured therein. A transverse rod 97 extends through the enlarged upper portion 98 of the spider 91 and may be connected to the conventional piston-cylinder assemblies as described in the aforementioned Brundage Patent No. 2,778,060 such that the entire assembly may be raised and lowered as hereinafter described. Referring again to FIG. 7, it will be seen that the top of cylinder 81 is closed with a hollow plug 99 threaded thereto as shown at 100, such plug being provided with a central aperture 101 accommodating the hollow rod 96. The plug 99 includes an upstanding annular portion 102 having threaded thereto a sleeve member 103 holding packing 104 in place to provide the proper sliding seal for the interior of plug 99 about the periphery of tube 96. A sliding seal 105 between the exterior of plug 99 and the interior of tubular member 34 is held in place by threaded ring 106. It can now be seen that the plug 99 and sleeve 81 can be vertically reciprocated as a unit with respect to the central tube 96 as well as the exterior tubular extension 34 having the spider 91 mounted thereon.

Figure 9:
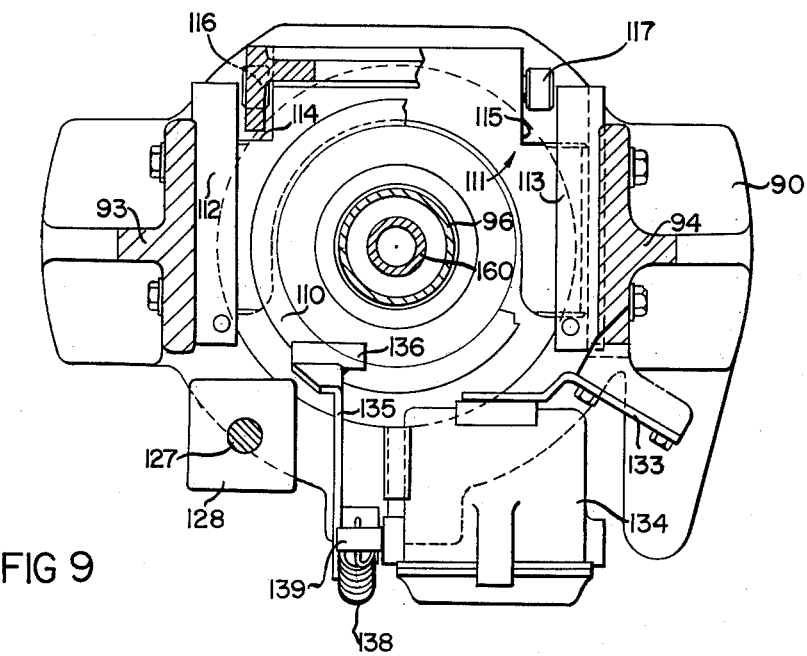
FIG. 9 is a fragmentary horizontal sectional view taken substantially on the line 9—9 of FIG. 8.

Threaded onto the annular extension 102 of the plug 99 is a stop ring 110 which cooperates with horizontally slidable stop plate 111 to provide the various positions of the cylinder 81 to obtain the required tire holding and piloting positions of the chucking segments 52. Referring now to FIG. 9, it will be seen that the stop plate 111 is of a U-shape configuration with the central or bight portion being circularly formed closely to conform to the shape of the locking ring 110. The sides of the stop plate 111 are mounted in guides 112 and 113 fixed to the upstanding frame portions 93 and 94 of spider 91. The back of the stop plate is cut away at each side thereof as seen at the top in FIG. 9 at 114 and 115 and rollers 116 and 117 are mounted in the resulting recesses.

As seen in FIG. 7, the downwardly projecting arm 120 of bell crank 121 is provided with yokes 122 on the opposite sides thereof which enclose the rollers 116 and 117 such that pivotal movement of the bell crank 121 about the pivot 123 will result in horizontal sliding movement of the stop plate 111. The pivot 123 is provided by a pivot pin extending between the upstanding portions 93 and 94 of the spider and the bell crank 121 may be secured thereto by means of a cotter pin or like element 124. The other arm 125 of the bell crank 121 is pivoted as at 126 to the rod 127 of piston-cylinder assembly 128. The blind end of piston-cylinder assembly 128 is pivoted at 129 to the base 90 of spider 91. The upstanding portions 93 and 94 of the spider 91 may be provided with bearings 130 and 131 for the pivot 123. Also as seen in FIG. 8, the lower leg 120 of the bell crank 121 is in effect a rectangular frame member with a hollow center portion 132 and the upper arm 125 of the bell crank is laterally offset to clear the tube 96 extending centrally through the spider 91. It can now be seen that retraction of the rod 127 within the piston-cylinder assembly 128 will move the lower end of the bell crank outwardly thus horizontally to move the stop plate 111 outwardly to clear the stop ring 110. Likewise, extension of the rod 127 will move the stop plate 111 inwardly to act as a stop for the stop ring to hold the cylinder 81 in the required position.

Mounted on the upstanding portion 94 of the spider 91 there may be provided a bracket 133 on which switch mechanism 134 is mounted. This switch mechanism is actuated by an arm 135 having contact 136 on the end thereof which engages the top of the plug 99. The other end of the arm may be pivoted as shown at 137 and is connected to spring 138 which is in turn fastened to pin 139 protruding from the switch mechanism 134. The movement then of the plug and, of course, the cylinder 81 to its uppermost position will pivot the arm 135 in a counterclockwise direction about the pivot 137 to actuate switching assembly 134. This will then cause movement of the stop plate 111 to the left to insert the stop plate beneath the stop ring 110 as hereinafter more fully described.

Figure 10:
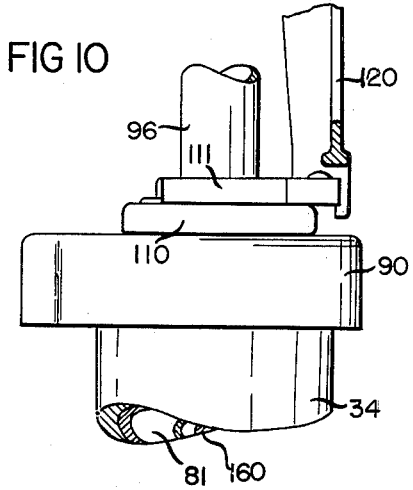
FIGS. 10 and 11 are fragmentary schematic elevational views illustrating the position of the stop plate with respect to the stop ring.
Figure 11:
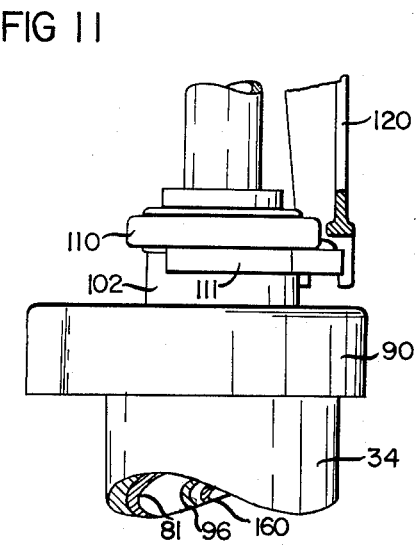

Referring now to FIGS. 10 and 11, FIG. 10 illustrates the ram or cylinder 81 in locked position when the chuck segments are in chucking or tire holding position with the stop ring 110 beneath the stop plate 111. FIG. 11 shows the ram or cylinder 81 in locked position when the chuck segments are in piloting position and the stop ring 110 is on top of the stop plate 111.

In order to obtain movement of the cylinder 81 within the tubular extension 34, there is provided a piston 150 within such cylinder 81 on the end of tube 96. As seen in FIG. 7, this piston 150 is mounted on the reduced end portion of the tube 96 by means of a nut 151 and such piston includes three block members 152, 153 and 154 clamped together by screws 155 with sliding seals 156 and 157 interposed between blocks 152 and 153; and 153 and 154, respectively. A small tube or pipe 160 is concentrically positioned within the tube 96 and opens below the piston as shown at 161. An annular ring 162 is welded to the inner tube 160 concentrically to space and seal the periphery of such tube 160 with respect to the inner diameter of the tube 96. An aperture 163 is provided for fluid communication between the interior of the tube 96 and the chamber above piston 150. The opening 161 provides air communication between the tube 160 and the space below the piston 150 (chamber 84, FIG. 2). It can now be seen that if fluid is admitted under pressure through the aperture 163 to the area above the piston 150 and the tube 160 is exhausted, the pressure will react against the top or plug 99 of the cylinder 81 to raise such cylinder with respect to the piston 150. Likewise, if the tube 160 is pressurized and the chamber above the piston 150 is exhausted to atmosphere, the pressure will react against the web 83 of the ram member 77 (FIG. 2) to force the ram downwardly with respect to the fixed piston 150. Thus it can be seen that the ram 78 may be raised or lowered with respect to the tubular member 34 and that the position of the stop plate 111 as seen in FIGS. 10 and 11 will hold the stop ring 110 in either piloting or tire holding position.

FIGS. 12 and 13 Embodiment

In the embodiment of the apparatus shown in FIG. 2, the tire chucking segments move radially outwardly slightly below the bottom edge of the tire bead thus clearing the same and it will readily be understood that this spacing may be accomplished by causing the tire chucking segments to pivot downwardly as they are moved radially outwardly. This is accomplished in the embodiment illustrated in FIGS. 12 and 13. In this form of the invention, a top mold section 170 is provided with a toe ring 171, such toe ring having a bead engaging surface 172 which is frusto-conical and adapted for the bead of passenger automobile tires. The toe ring 171 is fastened to the radially extending portion 173 of frame member 174 as, for example, by bolts 175. The upwardly extending annular portion 176 of frame member 174 is bolted as at 177 to ring 178 welded to tubular extension 179. The frame member is provided with substantially radially extending web portions 180 interconnected by pivot pins 181 which mount bell cranks 182. Interposed between such web members are opposed guides 183 for reception therein of slide 184. A link 185 is pivoted to the slide at 186 and to the lower arm 187 of bell crank 182 at 188. The other arm of bell crank 182 is provided with a roller 189 adapted to fit within annular recess 190 of ram member 191 which is secured as at 192 to sliding cylinder 193. The ram nose or head 194 is secured to the member 191 as shown at 195 and has a radially extending shoulder 196 forming the lower portion of annular recess 190. This recess cooperates with the rollers 189 in the same manner as in the FIG. 2 embodiment to pivot the bell cranks 182 about the pivots 181 to cause the lower pivot 188 to move through an arc about pivot 181 as the center.

Secured to the links 185 are the chucking segments 197 which may be substantially of the planar configuration shown in FIG. 3. The lower arms 187 of the bell cranks 182 are provided with apertures to accommodate rods 198 and 199 which are surrounded by compression springs to exert a force upon the lower arm 187 tending to pivot the illustrated bell crank about the pivot 181 in a counterclockwise direction as shown. It can now be seen that as the bell crank 182 pivots about the pivot 181, the pivot 188 will cause the chucking segments 197 to move radially outwardly along the guideway 183 and also to pivot downwardly about the pivot 186. This will move the chucking segments from the FIG. 12 position to the extended FIG. 13 position as the ram descends such that the tip edge 200 of the chucking segments 197 will substantially clear and yet underlie the tire bead to preclude the same from inadvertently and prematurely being stripped from the top mold section 170.

FIG. 14 Embodiment

Referring now to FIG. 14, there is illustrated a further modification of the present invention wherein a top mold section 210 is provided with a toe ring 211 having a cylindrical bead forming surface 212 to accommodate heavy-duty dual bead truck tires. The toe ring is movably mounted with respect to the top mold section and is secured to the radially extending peripheral portion 213 of frame member 214 with the upstanding annular portion 215 thereof being secured to the tubular member 216. Web members 217 are provided as in the FIG. 2 embodiment to accommodate pivot pins 218 whereby bell cranks 219 may be pivoted thereabout. Welded to the hub of bell crank 219 is a downwardly extending plate 220 having aperture 221 therein accommodating rod 222. A bearing member 223 bears against such plate as the result of the pressure of spring 224 mounted on such rod. The lower end of the arm is provided with yokes 225 enclosing pin 226 of slide 227, such slide being fastened as by screws 228 to the chucking segment 229. The slide is mounted between guides 230 on the sides of the web members 217. The upper end of the bell crank is provided with a contact roller 231 engageable recess 232 in the ram head. This recess is formed by member 234 and member 235 which extends downwardly to form the tip or nose of the ram 236. Locking ring 238 holds filler ring 239 to member 235 which is in turn utilized to mount member 234 as by bolts. The ram member 235 is threaded and sealed to the cylinder 240 shown at 241 and piston 242 is provided on the end of hollow rod 243 in the same manner as illustrated in FIG. 7. Thus, fluid under pressure may be applied to the interior of member 235 through the tube 244 which is concentric with tube 243, or fluid under pressure may be applied to chamber 245 through aperture 246 while the fluid in chamber 247 is being exhausted. Vertical movement of the ram is thus obtained, such vertical movement causing pivoting of the bell crank 219 about pivot 218 horizontally radially to slide chucking segment 229 to the pilot position shown at 248 and to the chucking or tire holding position shown at 249 wherein the tip edge 250 will underlie the bead of the tire. Here as in the other embodiments illustrated, the ram head is provided with a radially extending shoulder 251 such that when the ram is retracted, the radially extending shoulder will contact the roller 231 to replace it in the annular slot thus to retract the segments as the ram is retracted. As is evident in FIG. 14, the members 236, 239, 229, 213 and 211 present a smooth surface so as not to damage the bladder when it is pressurized thereagainst.

In the various embodiments, it can be seen that a vertical movement of the tubular member 34 as in the FIG. 2 embodiment, 179 in the FIG. 12 embodiment, or 216 in the FIG. 14 embodiment, will vertically move the toe rings with respect to the top mold section. Referring particularly to FIG. 14, it will be seen that a packing 255 is provided held by ring 256 for slidably sealing the tubular extension 216 with respect to the frame member 257. This vertical movement of the outer tubular member will be accomplished through mechanism attached to the transverse rod 97 as shown in FIG. 8.

Operation

Referring first to the three-position chucking mechanism embodiment of the present invention, reference may be had to the schematic views shown in FIGS. 15 through 21 inclusive showing the tire press with such chucking apparatus in the various operating positions. Referring first to FIG. 15, the press is shown in its open position at the start of the cycle and a loading or like mechanism may be employed to place the heavy-duty truck tire carcass C such that it is pressed down into engagement as shown at 300 around the bottom toe ring 21. However, it is noted that such carcass may be slightly out-of-round at the top or tilted slightly so that the axis of the top bead does not coincide with the axis of the press. Moreover, dual-bead truck tires have beads with cylindrical inner surfaces to fit on cylindrical rims and therefore the top toe ring 26 will not enter the top bead if out-of-round or off-center relative to the top toe ring 26. Such is often the result in heavy-duty truck tires wherein the beads are built on undercut shoulder drums as shown at 302 and unlike normal automobile tire carcasses, such are difficult properly to place on the toe rings. The chucking segments initially are set to pilot position since switching mechanism 134 has been actuated by maximum upward movement of the cylinder 81 to energize the piston-cylinder assembly 128 inwardly to slide the stop plate 111 after the stop ring 110 is vertically thereabove. Lowering of the cylinder 81 by introduction of fluid pressure through the opening 161 until the parts have reached the position shown more particularly in FIG. 11 will cause the chucking segments to move to the intermediate or pilot position. As shown in the press of FIG. 15, the chucking segments 52 may be provided with a more pronounced peripheral sloping portion 303 such that when the press head reaches the position shown in FIG. 16, the chucking segments will form a circular tapered pilot. As the press moves to the position wherein the upper bead of the carcass C contacts the segments, such bead will be guided into the upper toe ring 26 thereby aligning the tire carcass C. Simultaneously with the piloting of the upper bead of the carcass into the toe ring, pressure is provided in the well 23 to cause invagination of the bladder 22 such that it will enter the carcass causing the same to belly as the mold sections come together. Referring now to FIG. 17, the carcass is shown being bellied by the downward movement of the top press head and the chuck segments will now be retracted having served their piloting function and this is accomplished simply by inserting fluid pressure through the aperture 163 above the piston and exhausting the chamber 84 below the piston. At this time, the stop plate 111 will be retracted by energization of the piston-cylinder assembly 128. Moving now to FIG. 18, the press is shown in its closed position and the curing cycle is on. In this position the chucking segments will be retracted as in the FIG. 17 position, such that the bottom surfaces of the segments and the ram head present a smooth surface contacting the bladder as not to cause undue wear thereon. If desired, the bladder may be provided with a reinforced and thickened portion 306 closely conforming to the shape of the ram head 78.

Figure 20:
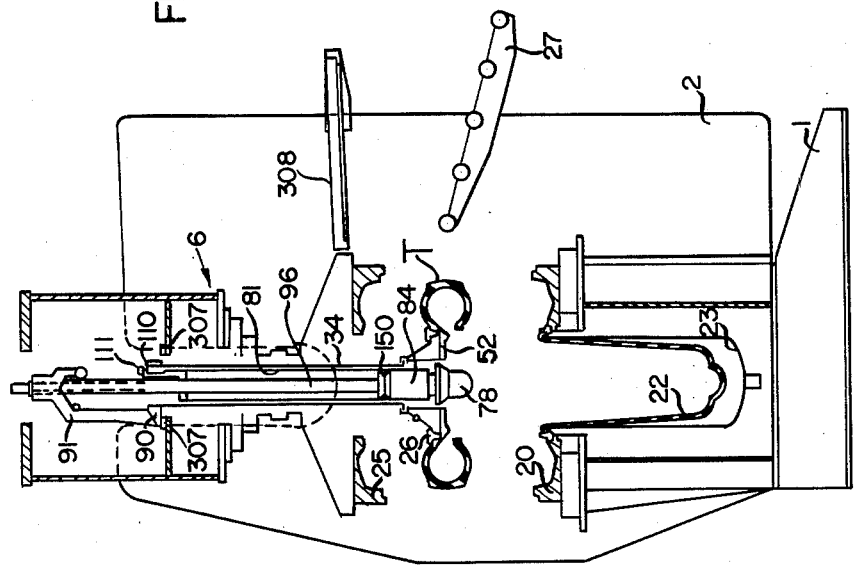
Figure 26:
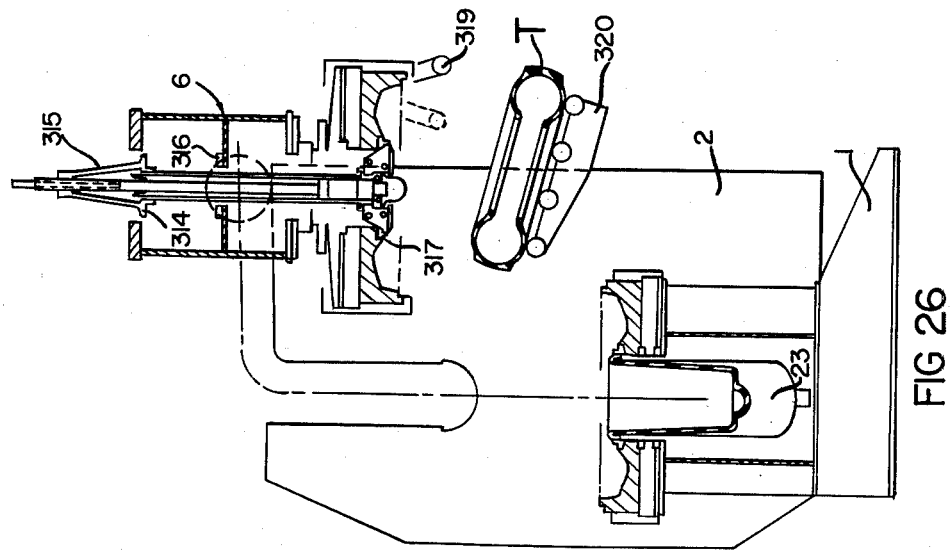

Moving now to FIG. 19, at the end of the curing cycle, the press opens approximately three inches and pressure is then provided through the opening 161 to chamber 84 to extend the ram head 78 to its maximum down position to invert the bag 22 to its original position within the well. It will, of course, be realized that the well will be exhausted to atmosphere readily to permit this insertion of the bag therein. Of course, the maximum downward movement of the ram causes the segments 52 to move to the maximum out or tire holding position such that the peripheral edge 56 of the segments will underlie the top bead 57 of the tire T. At this time, the stop plate 111 will be moved inwardly and as the press continues opening as shown in FIG. 20, the ram head will be retracted to the position shown more clearly in FIG. 10 in which the stop ring 110 underlies the stop plate 111. Also, at this time, actuation of the piston-cylinder assemblies or other mechanism to move downwardly the transverse rod 97 moving downwardly the spider 91 will consequently move down the upper toe ring 26 from the top press head until the base 90 of the spider contacts the stops 307. As the result of this downward movement of the assembly, the tire is stripped from the upper mold section 52. The ram being held in the vertical position of FIG. 10 by the stop plate 111 maintains the chucking segments in the chucking or tire holding position such that the bead is confined between the edge of the chucking segments and the toe ring.

Figure 21:
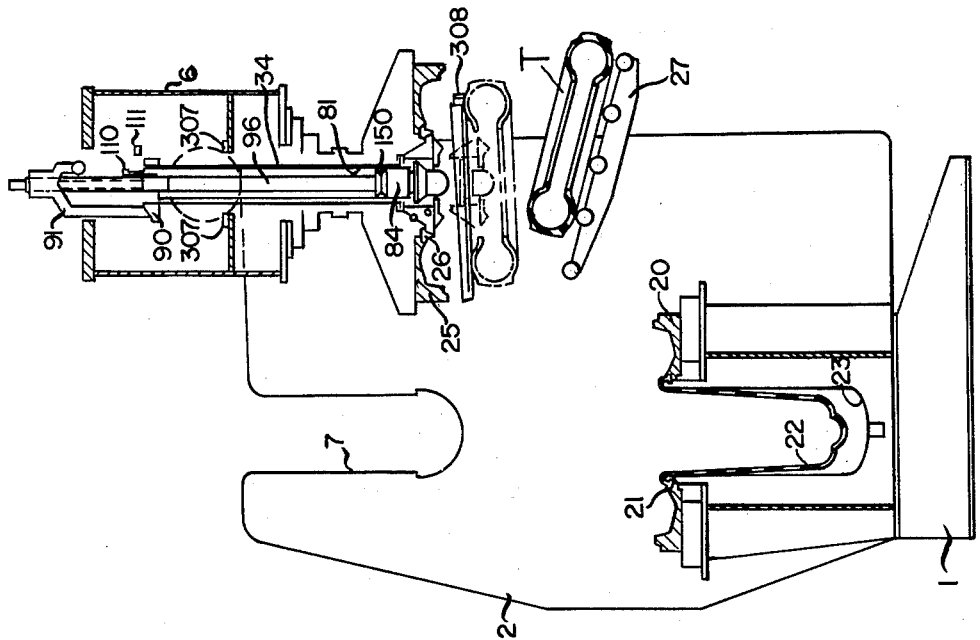

Moving now to FIG. 21, the press head moves to its full open position. In this position, the lateral opening of the press head has moved the now downwardly extended tire T beneath a stripping mechanism 308 which may take the form of a U-shape member having a central opening therein sufficient to accommodate the movement of the toe ring therethrough. The stop plate 111 is now retracted and this then permits the stop ring 111 and the cylinder 81 to move upwardly causing the chucking segments radially to move inwardly such that the edges no longer underlie the bead of the tire. Upward movement of the transverse shaft 97 will then cause contact between the tire T and the stripping mechanism 308 now interposed between the tire and the top mold section to strip the tire from the top toe ring. Continued upward movement of the toe ring and chucking mechanism returns them to the central nested position within the top mold section and the switching mechanism 134 replaces the stop plate 111 beneath the stop ring 110 when the cylinder 81 reaches its maximum upper position. It will, of course, be understood that once the chucking segments are withdrawn, the tire may be of such weight as to fall freely from the toe ring but since the tire is now in proper position over the discharge conveyor, such is inconsequential. While the tire T is being discharged, a new carcass C can be placed on the now exposed bottom mold section 20 to repeat the described cycle.

*Two Position Embodiment (FIGS. 22–26)*

In the case of passenger automobile tires, since the tire carcass C is considerably smaller than in truck tires, and since the inner surfaces of the beads will be frusto-conical for use with tapered rims, it is relatively easy to place or properly set the lower bead of the carcass on the bottom toe ring and likewise the tapered top toe ring 26 will itself act as a pilot to enter the top bead even though it may be slightly out-of-round or off-center and hence the intermediate tire bead piloting position is not required. This then means that the mechanism for a tire press employed to produce automobile tires need not require the stop plate actuating mechanism since the intermediate position of the segments is not necessary.

As in the heavy-duty truck tire apparatus, the tire carcass is positioned on the toe ring of the bottom mold section and the press is closed and the bladder is inserted into the tire for shaping. Referring first to FIG. 22, the chucking segments will be in their retracted position during the closing of the press and insertion of the bladder. At the end of the curing cycle as shown in FIG. 23, the press opens approximately three inches and the bladder is rammed into the well or reservoir 23 by the head 311 as the result of pressurization of the chamber 312 below piston 313.

Figure 25:
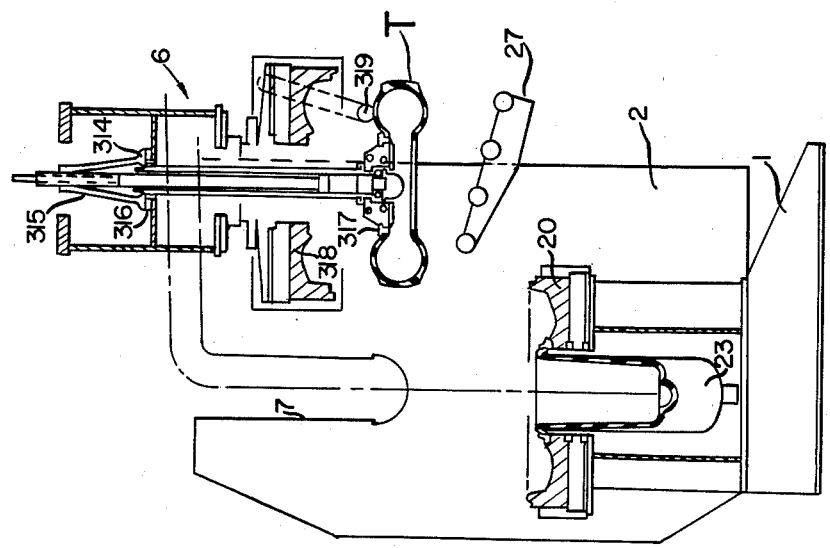

As shown in FIG. 24, as the press head moves to its completely open position, the head 311 will be maintained in its downward position thus to maintain the chucking segments in the tire holding position. In FIG. 25, the entire assembly is then lowered until the base 314 of spider 315 contacts the stops 316 lowering the top toe ring 317 from the top mold section 318. When the tire is lowered away from the top mold section and thus stripped therefrom, the segments will be retracted by the retraction of the ram head 311 and the tire may then fall from the top toe ring 317. In order to ensure a stripping of the tire from the toe ring, a pivotally mounted arm 319 may be swung into the inner position overlying the tire such that when the entire mechanism is raised, the tire will be forced from the top toe ring 317 to fall on conveyor 320. Both the conveyor 320 and the stripping mechanism 319, as in the three position chucking apparatus, may be mounted on the side plates 2 of the press.

It can now be seen that there is provided a chucking apparatus for a tire press which will hold the tire in the top press head and properly assist in the stripping thereof from the top mold section such that the tire will be placed upon the discharged conveyor for removal from the press or delivery to a post-inflation device. It will be understood that in both embodiments, the press itself may be identical in form and that only the mold sections and chucking apparatus will be changed if the heavy-duty truck tires are to be produced requiring the intermediate piloting position. Whereas the chucking apparatus is illustrated as used with a press head which moves directly away from and then laterally of the bottom mold section, it will be understood that such chucking apparatus may be employed with other type presses.

Moreover, the invention is readily adaptable to presses wherein the bladder will not be employed and only a short movement of the annular groove in the ram or other mechanism is required fully to extend and retract the chucking segments. In any event, the segments will hold or lock the cured tire to the top toe ring to be released only when the tire has cleared the bottom mold section. It can readily be seen that the chucking apparatus of the present invention is readily adaptable to any type tire press wherein top and bottom mold sections are utilized and moved one with respect to the other to open and close such press.

Other modes of applying the principles of the invention may be employed, change being made as regards the details described, provided the features stated in any of the following claims or the equivalent of such be employed.

We, therefore, particularly point out and distinctly claim as our invention:

1. In a tire press comprising a stationary mold section and a movable mold section, means operative to move said movable mold section away from and then laterally with respect to said stationary mold section to open said press, a toe ring for said movable mold section, means vertically to move said toe ring, and chucking means mounted on said movable mold section adapted peripherally to underlie said toe ring to hold a tire cured in said press axially centered with respect to said movable mold section as said press is thus opened to remove said tire from said press laterally of said stationary mold section.

2. The tire press according to claim 1 wherein said chucking means includes tire chucking segments radially movable with respect to said toe ring adapted to underlie the bead of such tire in their radial outermost position and vertically to clear such bead in their radially innermost position.

3. A tire press according to claim 2 including a vertically extensible bladder ram mounted in said movable mold section, and means interconnecting said ram and said chucking segments to move said segments radially in response to vertical movement of said ram.

4. A tire press as set forth in claim 3 including an annular recess in said ram, and bell cranks having rollers mounted on the ends thereof engageable within said recess upon vertical movement of said ram, said bell cranks being connected to said chucking segments radially to move the same in response to vertical movement of said ram.

5. The tire press according to claim 4 including a frame holding said toe ring, and guide means in said frame, said chucking segments being confined in said guide means for radial movement only.

6. The tire press according to claim 5 wherein said chucking segments are pivotally connected to said bell cranks.

7. A tire press according to claim 6 including a vertically movable tubular extension in said movable mold section confining said ram for vertical movement, and means interconnecting said toe ring, frame and tubular extension for vertical movement as a unit with respect to said movable mold section.

8. The tire press set forth in claim 7 including stripping means adapted to be positioned intermediate the tire and the movable mold section to strip such tire from the movable mold section toe ring as the same is moved toward said movable mold section.

9. The tire press according to claim 8 including stop means to hold said ram and tubular extension in a predetermined position thus to position said chucking segments in an intermediate piloting position to guide the bead of a tire carcass into the toe ring of the movable mold section as said press is closed.

10. The tire press according to claim 9 wherein said stop means is engageable with a stop ring mounted on the top of said vertically movable ram.

11. The tire press according to claim 10 wherein said stop means is a horizontally movable stop plate actuated by a piston-cylinder assembly.

12. In a tire press comprising a stationary mold section and a movable mold section, said movable mold section having a toe ring therein, means to move said movable mold section away from and then laterally with respect to said stationary mold section to open said press, a well within said stationary mold section and a bladder in said well adapted to extend vertically within a tire carcass to swell the same to tire shape; and chucking means mounted on said movable mold section adapted to underlie the bead of such tire to hold a cured tire in a fixed axial position centered with respect to said movable mold section as the press is thus opened to ensure stripping of said tire therefrom laterally of said bottom mold section.

13. The tire press set forth in claim 12 including ram means mounted centrally in said movable mold section adapted to enter said well to strip said bladder from such tire and insert it in said wall.

14. The tire press set forth in claim 13 including means vertically to reciprocate said ram means, and means connecting said ram means and chucking means to cause said chucking means to underlie the bead of such tire as said ram means enters said well.

15. The tire press set forth in claim 14 wherein said connecting means comprises pivotally mounted levers operatively connected to said chucking means and to said ram means.

16. The tire press set forth in claim 15 wherein said chucking means comprises radially movable segments connected to said levers, said segments being confined in radially extending slideways for movement to underlie the bead of such tire.

17. The tire press set forth in claim 16 wherein said ram means comprises an axially slidable cylinder disposed about a fixed piston, and groove means on said ram means engageable with said levers operative to move said levers and thus said segments in response to movement of said ram when said groove and levers are thus engaged, said ram means downwardly terminating in a rounded nose adapted to contact said bladder.

18. In combination, a tire press having a stationary mold section and a movable mold section, said movable mold section being movable away from and laterally of said stationary mold section to open said press, a well in said stationary mold section and a tire forming bladder secured therein, a bladder ram mounted in said movable mold section adapted to be inserted in said well to insert said bladder therein, tire holding means mounted on said movable mold section adapted to secure such tire in a fixed position with respect to said movable mold section for movement therewith, and means responsive to extension of said bladder ram to actuate said tire holding means.

19. The combination set forth in claim 18 wherein said tire holding means comprises radially movable segments; and link means interconnecting said segments and ram to move said segments radially in response to vertical movement of said ram.

20. The combination set forth in claim 19 including means simultaneously to move said segments radially outwardly and to move the peripheral edges thereof downwardly in response to movement of said ram.

References Cited in the file of this patent

UNITED STATES PATENTS

| | | |
|---|---|---|
| 1,784,780 | Bronson | Dec. 9, 1930 |
| 2,296,800 | Soderquist | Sept. 22, 1942 |
| 2,730,763 | Brundage | Jan. 17, 1956 |
| 2,911,670 | Soderquist | Nov. 10, 1959 |
| 2,959,815 | Brundage | Nov. 15, 1960 |
| 2,980,950 | Smyser | Apr. 25, 1961 |
| 2,997,740 | Soderquist | Aug. 29, 1961 |

FOREIGN PATENTS

| | | |
|---|---|---|
| 215,704 | Australia | Apr. 14, 1958 |